April 16, 1968 C. HILL 3,378,093
CENTER DIFFERENTIAL GEAR UNITS
Filed Oct. 18, 1965 3 Sheets-Sheet 1

Inventor
CLAUDE HILL
By
Mason, Fenwick & Lawrence
Attorneys

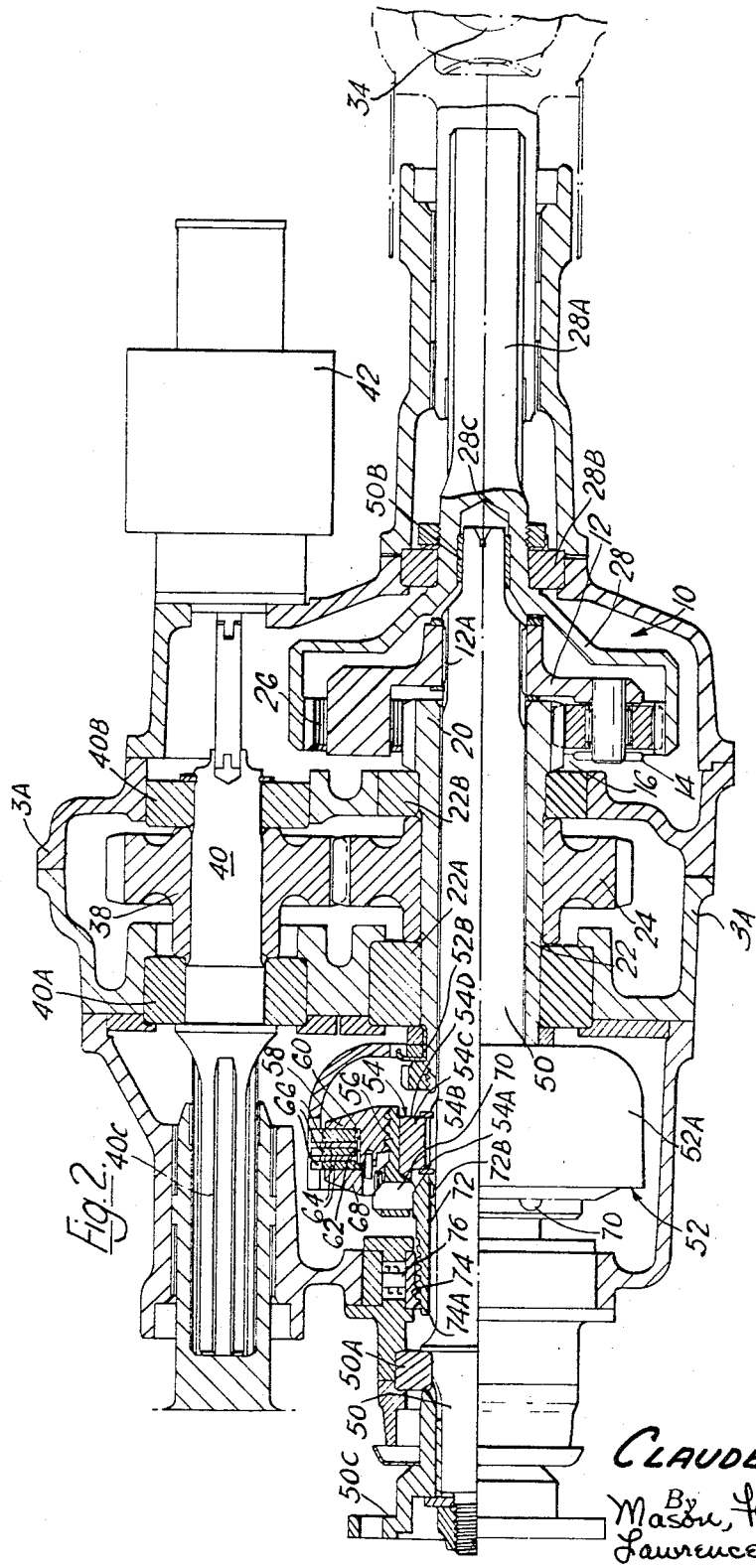

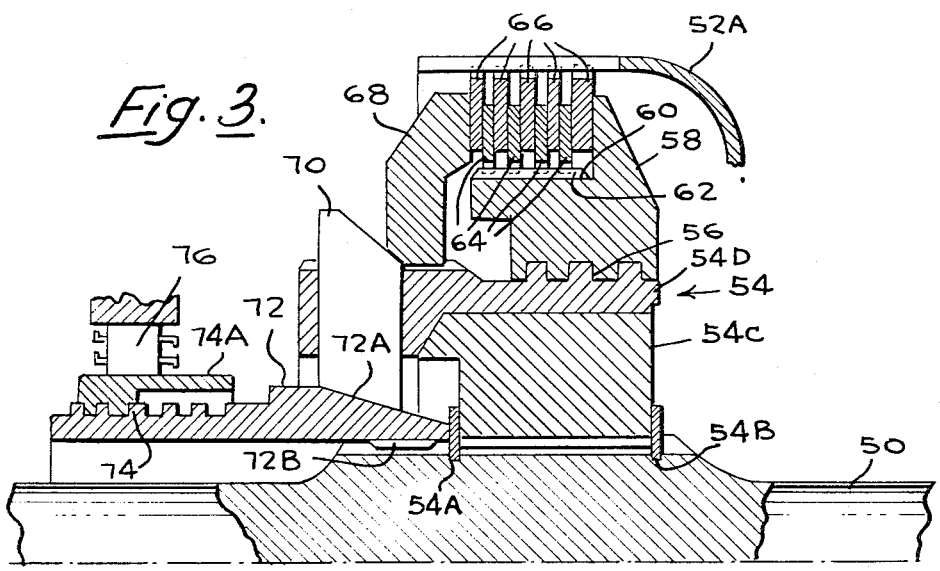

United States Patent Office 3,378,093
Patented Apr. 16, 1968

3,378,093
CENTER DIFFERENTIAL GEAR UNITS
Claude Hill, Kenilworth, Warwickshire, England, assignor to Harry Ferguson Research Limited
Filed Oct. 18, 1965, Ser. No. 497,328
Claims priority, application Great Britain, Oct. 20, 1964, 42,676/64
9 Claims. (Cl. 180—44)

ABSTRACT OF THE DISCLOSURE

In a four wheel drive motor vehicle, drive is transmitted to front and rear inter-wheel differential gears by way of a center differential gear and drive transfer unit whereof the input shaft is coaxial with a three-element planetary spur type differential gear and drives the planet carrier, a rear output is taken from the annulus, a front output is taken from an offset shaft driven through a pair of transfer gears by the sun gear, and a one way overrunning clutch is mounted coaxially with the planetary differential gear for locking the planet carrier to the sun gear when the front wheels tend to spin and/or the rear wheels tend to lock, the axle ratios and transfer gear ratio being selected to induce a predetermined advancing movement of the annulus and planet carrier round the sun gear during normal forward drive.

---

Figure 1:
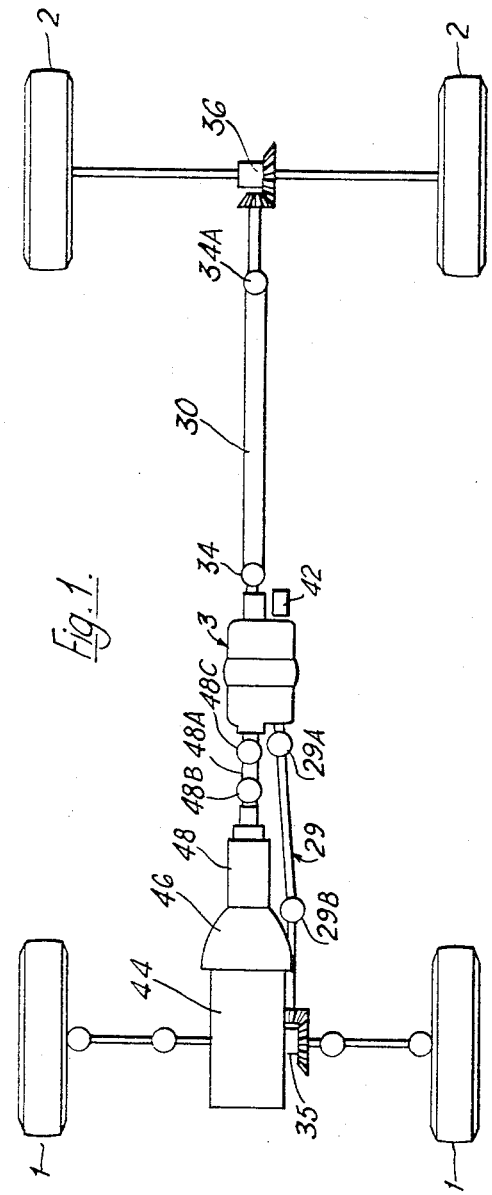

This invention relates to four wheel drive motor vehicles having front and rear differential gears respectively drivingly connected to front and rear pairs of road wheels and is particularly concerned with transmission means in such vehicles and providing a drive from the vehicle motor to the front and rear differential gears.

According to the present invention, there is provided a four wheel drive motor vehicle having front and rear pairs of road wheels, first and second drive shafts and front and rear differential gears drivingly connecting the drive shafts respectively to the pairs of wheels, a prime mover, and transmission means providing a driving connection between the prime mover and the first and second drive shafts with freedom for differential action one relative to the other, said transmission means including a three-element planetary centre differential gear of which the three elements are an input element and two output elements, a first transmission shaft disposed coaxially with the input element of the centre differential gear and drivingly connecting the said input element to the prime mover, a second transmission shaft offset with respect to the first transmission shaft, a third transmission shaft disposed coaxially with the first transmission shaft and drivingly connected to one of the output elements of the centre differential gear, drive transfer means providing a drive between the third transmission shaft and the second transmission shaft and including toothed wheels drivingly connected to and coaxial one with the third transmission shaft and one with the third transmission shaft and one with the second transmission shaft, and an overrunning clutch device having first and second mutually coaxial clutch members each disposed coaxially with the first and third transmission shafts and drivingly connected one to one element of the centre differential gear and one to one of the other elements of the centre differential gear, said clutch members being rotatable one relative to the other when the first clutch member overspeeds the second clutch member in at least one direction of rotation and mutually engaged to lock the centre differential gear when the second clutch member tends to overspeed the first clutch member in at least said one direction of rotation, the other of said output elements being drivingly connected to one of the drive shafts, said second transmission shaft being drivingly connected to the other drive shaft, the ratios of the front and rear differential gears and the ratio of the toothed wheels of the said drive transfer means being such that during normal forward drive, when the road wheels are rotating without slip, that element of the centre differential gear which is connected to the first clutch member rotates at a speed which is a greater by a predetermined percentage than the speed of that element of the centre differential gear which is connected to the second clutch member.

An embodiment of the present invention will now be described, by way of example, with reference to the accompanying drawings, in which:

FIGURE 1 is a diagrammatic plan view of part of a four wheel drive vehicle in accordance with the present invention and embodying the transmission means detailed in FIGURE 2, FIGURE 2 is an enlarged, partial sectional elevational view of the transmission means illustrated in FIGURE 1, and FIGURE 3 is an enlarged sectional view of the clutch device illustrated in FIGURE 2.

In FIGURE 1 of the drawings, a fourwheel drive motor vehicle has front and rear pairs of road wheels 1 and 2, respectively, first and second drive shafts in the form of front and rear propeller shafts 29 and 30, respectively, front and rear differential gears 35 and 36, respectively, a prime mover or engine 44, and transmission means in the form of a center differential gear and drive transfer unit 3 providing a driving connection between the engine 44 and the front and rear propeller shafts 29 and 30. A disengageable clutch 46 and a change-speed gear box 48 are drivingly interposed between the engine 44 and the unit 3, the gearbox output being connected to an input or first transmission shaft 50 (see FIGURE 2) in the unit 3 by way of a relatively short connecting shaft 48A which incorporates universal joints 48B and 48C represented diagrammatically in FIGURE 1. The front and rear propeller shafts 29 and 30 incorporate universal joints 29A, 29B and 34, 34A, respectively.

Apart from the center differential gear and drive transfer unit 3, the purpose and operation of the other parts of the vehicle which are mentioned above are well known and the following description of the construction and operation of the unit 3 is made with reference mainly to FIGURE 2.

The components of the unit 3 are housed in a separate casing 3A and comprise, generally, a three-element planetary spur type center differential gear 10, the first transmission shaft 50, a second transmission shaft 40, a third transmission shaft 22, drive transfer means 24, 38, and an overrunning clutch device 52.

More particularly, the center differential gear 10 has as its three elements, a sun gear 16, an annulus or annular gear 26, and a planet carrier 12 which carries planet wheels 14. Only one planet wheel is illustrated in FIGURE 2. Each planet wheel 14 meshes with the sun gear 16 and with the annulus 26. The gear teeth of the annulus 26 are formed internally on the periphery of a cupped member 28 which has an integrally formed stem portion 28A part of which is rotatably supported in the casing 3A by a bearing 28B. The stem portion 28A is spline connected to the universal joint 34 and is thus drivingly connected to the rear pair of road wheels 2, 2 by way of the propeller shaft 30, universal joint 34A, and rear differential gear 36.

The first transmission shaft 50 is disposed coaxially with the center differential gear 10 and is rotatably supported near its forward end, with respect to the front and rear of the vehicle, in the casing 3A by a bearing 50A, and at its rear end by a bearing 50B which is located in a bore 28C formed concentrically in the stem portion 28A. The planet carrier 12 is splined to the first transmission shaft 50 at 12A and a flanged connector 50C is provided on the forward end of the shaft 50 for connecting same to the universal joint 48C. Thus the shaft 50 drivingly connects the planet carrier 12 to the engine 44.

The second transmission shaft 40 is spaced laterally from and parallel to the shaft 50 and is rotatably supported in the casing 3A by bearings 40A and 40B. A forward extension 40C of the shaft 40 is spline connected to the universal joint 29A and is thus drivingly connected to the front pair of road wheels 1 by way of propeller shaft 29, universal joint 29B and front differential gear 35.

The third transmission shaft 22 consists of a tube freely surrounding the shaft 50 and formed integrally with the sun gear 16 and rotatably supported in the housing 3A by bearings 22A and 22B.

Drive transfer means between the third shaft 22 and the second shaft 40 are provided in the form of a pair of mutually meshing toothed or gear wheels 24 and 38, the wheel 24 being secured to and coaxial with the shaft 22, and the wheel 38 being secured to and coaxial with the shaft 40. The ratio of the wheels 24 and 38 is discussed later herein.

The overrunning clutch device 52 has first and second mutually coaxial clutch members in the form of a collar 54 and a cup 52A, respectively. The cup 52A is secured to the third transmission shaft 22 at 52B and the collar 54 is splined to the first transmission shaft 50 and axially located thereon by snaprings 54A and 54B on opposite sides of the collar 54. Thus the cup 52A is drivingly connected to the sun gear 16 and the collar 54 is drivingly connected to the planet carrier 12. A set of mutually interleaved friction plates 64 and 66 are associated with the collar 54 and the cup 52A, respectively. The friction plates 66 are carried in axial slots formed in the periphery of the cup 52A, the peripheral edge of the plates 66 having radial tongues for cooperation with the slots in cup 53A so that the plates 66 rotate with the cup 52A and are freely axially movable relative thereto. The collar 54 consists of two concentric and mutually secured annular portions 54C and 54D, and the outer portion 54D supports an annular presser member 58 which has a splined stepped portion 60 carrying the friction plates 64 which rotate with the presser 58 and are freely axially movable relative thereto. On the opposite side of the set of friction plates 64, 66 from the presser 58 is mounted an annular abutment member 68 which is shown, in FIGURE 3, in an operative position. The mounting of the abutment member is described later herein.

Mutually cooperating presser actuating elements in the form of engaged male and female helical threads 56 are interposed between the presser 58 and the portion 54D of the collar 54 whereby rotation of the presser 58 in one direction relative to the collar 54 induces axial movement of the presser 58 towards the abutment member 68 to press the friction plates 64 and 66 together against the abutment member and so lock the clutch. Rotation of the presser 58 in the opposite direction relative to the collar 54 induces axial movement of the presser 58 away from the abutment member so that the plates 64 and 66 are permitted to slip and rotate relatively to one another.

The clutch device 52 can thus be seen to be a one way overrun clutch, the "one way" being dependent upon the hand of the helical threads 56. It will be understood that in the unlocked or declutched condition, there is a drag, during rotation of the cup 52A relative to the collar 54 (i.e. overrunning) between the plates 64 and 66, so that the presser 58 is sensitive to the overrunning and moves towards and away from the abutment member 68 in accordance with the direction of overrun with respect to the hand of the helical threads 56. In this embodiment, the hand of the threads 56 is such that the collar 54 can overrun the cup 52A when the shaft 50 is rotated in a direction which corresponds with forward motion of the vehicle.

In operation, drive is transmitted from the gearbox 48 of the vehicle by way of the first transmission shaft 50 to the planet carrier 12 of the center differential gear 10 which divides the drive between the front and rear pairs of road wheels 1 and 2 with freedom for differential action one pair relative to the other pair. Drive to the rear pair of road wheels is taken from the annulus 26, and drive to the front pair of road wheels from the sun gear 16 by way of the third transmission shaft 22, gears 24 and 38 and second transmission shaft 40.

To provide overrun of the first clutch member, i.e., collar 54, relative to the second clutch member, i.e., cup 52A, during normal forward drive so that the clutch device 52 will adopt an unlocked condition, it is necessary for the center differential gear 10 to "work" during normal forward drive. That is to say, the planet carrier 12 must rotate slightly faster than the sun gear 16, i.e., the annulus 26 and the planet carrier 12 must "creep" around the sun gear 16 in addition to the rotation of the center differential gear 10 as a whole. This "creep" is achieved by choosing appropriate ratios for the front and rear differentials (i.e., the crown-wheel and pinion ratios) and for the transfer wheels 24 and 38. If the front and rear crown-wheel and pinion ratios, that is "axle-ratios," are the same, then the transfer ratio of wheels 24 and 38 must be less than 1:1 (the wheel 38 being the smaller). If the front axle ratio is less than the rear axle ratio, the transfer ratio of the wheels may be 1:1. If the front axle ratio is greater than the rear axle ratio, the transfer ratio must be sufficiently less than 1:1 to produce the required "creep" in the center differential gear.

It will be clear from the foregoing that, during normal forward drive, differential action may occur between front and rear propeller shafts 29 and 30, and that the amount of differential action between these shafts and which may occur in one sense is determined by the magnitude of the "creep" in the center differential gear 10.

In the embodiment described, the clutch device locks the center differential gear when the front wheels tend to spin and/or the rear wheels tend to lock and the allowable limit of front wheel spin or rear wheel lock is predetermined by the relationship of the front and rear axle ratios and the transfer ratio of the wheels 24 and 38. It is, of course, assumed in discussing the axle ratios, that the front and rear pairs of wheels are the same nominal diameter.

As the clutch device 52 is a one-way overrun device, it will be clear that in the event of a reversal of the drive to the shaft 50, the clutch device 52 would lock. It is, therefore, desirable that the clutch device 52 be disabled during reverse driving of the vehicle and in this embodiment the abutment member 68 may move to an inoperative position by virtue of being splined on the portion 54D of the collar 54 for axial movement relative thereto, and by virtue of being supported in its operative position by a withdrawable support element 72.

Referring to FIGURES 2 and 3, the portion 54D of the collar 54 carries three radial plungers 70, the outer end of each plunger 70 having a tapered portion which cooperates with a corresponding tapered portion on an adjacent face of the abutment member 68. The element 72 is tubular and coaxial with the shaft 50 and has a tapered end portion 72A which cooperates with corresponding tapered portions on the inner ends of the plungers 70. Thus, if the element 72 is withdrawn away from the plungers 70, the latter may move inwards and permit the abutment member 68 to move away from the set of friction plates 64, 66 to an inoperative position.

In its supporting position, as best shown in FIGURE 3, the element 72 is driven by the shaft 50 by way of mutually engaging short splines 72B. To effect withdrawal of the element 72 on reverse driving, the element 72 has external screw threads 74 engaged by an internally screw threaded member or nut 74A which is one-way rotatably supported in the casing 3A by a sprag clutch 76 which permits rotation of the nut 74A only in the forward direction of rotation of the shaft 50, the screw threads 74 being of such a hand that the element 72 is fed or withdrawn away from the plungers 70 upon reverse driving of the shaft 50 until the splines 72B disengage.

The sensor of an anti-skid braking system may be fitted to the unit 3, as indicated diagrammatically at 42 in FIGURES 1 and 2. Such braking systems are well known in the automotive art and a sensor suitable for use with the unit 3 would be the rotary inertia type having a drive shaft connected to the front propeller shaft 29 by way of the second transmission shaft 40.

In FIGURE 1, it will be noted that the engine 44, disengageable clutch 46, gearbox 48 and rear differential gear 36 are common to conventional two-wheel drive vehicles. It will be understood, therefore, that the center differential gear and drive transfer unit 3, above described, may form part of a "conversion-kit" for converting a two-wheel drive vehicle into a fourwheel drive vehicle.

I claim:

1. A fourwheel drive motor vehicle having front and rear pairs of road wheels, first and second drive shafts and front and rear differential gears drivingly connecting the drive shafts respectively to the pairs of wheels, a prime mover, and transmission means providing a driving connection between the prime mover and the first and second drive shafts with freedom for differential action one relative to the other, said transmission means including a three-element planetary center differential gear of which the three elements are in input element and two output elements, a first transmission shaft disposed coaxially with the input element of the center differential gear and drivingly connecting the said input element to the prime mover, a second transmission shaft offset with respect to the first transmission shaft, a third transmission shaft disposed coaxially with the first transmission shaft and drivingly connected to one of the output elements of the center differential gear, drive transfer means providing a drive between the third transmission shaft and the second transmission shaft and including toothed wheels drivingly connected to and coaxial one with the third transmission shaft and one with the second transmission shaft, and an overrunning clutch device having first and second mutually coaxial clutch members each disposed coaxially with the first and third transmission shafts and drivingly connected one to one element of the center differential gear and one to one of the other elements of the center differential gear, said clutch members being rotatable one relative to the other when the first clutch member overspeeds the second clutch member in at least one direction of rotation and mutually engaged to lock the center differential gear when the second clutch member tends to overspeed the first clutch member in at least said one direction of rotation, the other of said output elements being drivingly connected to one of the drive shafts, said second transmission shaft being drivingly connected to the other drive shaft, the ratios of the front and rear differential gears and the ratio of the toothed wheels of the said drive transfer means being such that during normal forward drive, when the road wheels are rotating without slip, that element of the center differential gear which is connected to the first clutch member rotates at a speed which is greater by a predetermined percentage, than the speed of that element of the center differential gear which is connected to the second clutch member.

2. A fourwheel drive motor vehicle according to claim 1, wherein the components of the said transmission means are housed in a separate casing, and the first and second drive shafts are, respectively, front and rear propeller shafts.

3. A fourwheel drive motor vehicle according to claim 2, including a change-speed gear box drivingly interposed between the prime mover and the first transmission shaft.

4. A fourwheel drive motor vehicle according to claim 1, wherein the overrunning clutch device has a set of first and second mutually interleaved friction plates respectively associated with the first and second clutch members for rotation therewith and free axial movement relative thereto, an abutment member on one side of the friction plates for cooperation with the set during clutching, a presser member on the opposite side of the friction plates from the abutment member and axially movable towards the abutment member to a first position in which the first and second friction plates are pressed against the abutment member and into mutual locking engagement and away from the abutment member to a second position in which the first and second friction plates are permitted to slip and rotate relatively to one another, and mutually cooperating presser actuating elements interposed between the presser member and one of the clutch members, at least one of the actuating elements defining a ramp face of at least partly helical formation for moving the presser member to the first position when the second clutch member tends to overspeed the first clutch member in one direction of rotation.

5. A fourwheel drive motor vehicle according to claim 4, wherein the second clutch member is formed as a cup, the first clutch member is a collar disposed within the cup, the abutment member is annular and is supported by the collar, the presser member is annular and is mounted on the collar, and the presser actuating elements are male and female threads on the collar and on the presser respectively, and including an externally splined stepped portion on the presser member and extending towards the abutment member and carrying the first set of friction plates, and an axially slotted peripheral portion on the cup and carrying the second friction plates.

6. A fourwheel drive motor vehicle according to claim 5, including mutually engaged splines on the collar and on the abutment member for permitting movement thereof axially of the collar between an operative position and an inoperative position, and a withdrawable support element supporting the abutment member in its operative position.

7. A fourwheel drive motor vehicle according to claim 1, wherein said center differential gear is a spur type gear whereof the input element is the planet carrier and the output elements are respectively the sun gear and the annulus.

8. A fourwheel drive motor vehicle according to claim 7, wherein the third transmission shaft is connected to the sun gear of the centre differential gear.

9. A fourwheel drive motor vehicle according to claim 8, wherein the third transmission shaft is tubular and sleeves the first transmission shaft.

References Cited

UNITED STATES PATENTS

| | | | |
|---|---|---|---|
| 2,228,581 | 1/1941 | Olen | 180—44 |
| 2,574,986 | 11/1951 | Schou | 74—714 |
| 2,768,538 | 10/1956 | Simonds | 74—710.5 |
| 2,796,941 | 6/1957 | Hill | 180—44 |
| 3,073,405 | 1/1963 | Hill et al. | 180—44 |
| 3,081,836 | 3/1963 | Hill | 180—44 |
| 3,107,763 | 10/1963 | Hill | 180—44 X |
| 3,261,231 | 7/1966 | Hill | 74—711 |

DONLEY J. STOCKING, *Primary Examiner.*

ARTHUR T. McKEON, *Examiner.*

J. R. BENEFIEL, *Assistant Examiner.*